United States Patent
Chari et al.

(10) Patent No.: US 9,854,057 B2
(45) Date of Patent: Dec. 26, 2017

(54) NETWORK DATA COLLECTION AND RESPONSE SYSTEM

(71) Applicant: International Business Machines Corporation, Armonk, NY (US)

(72) Inventors: Suresh N. Chari, Tarrytown, NY (US); Pau-Chen Cheng, Yorktown Heights, NY (US); Xin Hu, White Plains, NY (US); Lawrence Koved, Pleasantville, NY (US); Josyula R. Rao, Briarcliff Manor, NY (US); Reiner Sailer, Scarsdale, NY (US); Douglas L. Schales, Ardsley, NY (US); Kapil K. Singh, White Plains, NY (US); Marc P. Stoecklin, Bern (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 658 days.

(21) Appl. No.: 14/270,937

(22) Filed: May 6, 2014

(65) Prior Publication Data

US 2015/0326594 A1    Nov. 12, 2015

(51) Int. Cl.
G06F 21/00    (2013.01)
H04L 29/08    (2006.01)
H04L 29/06    (2006.01)

(52) U.S. Cl.
CPC ........ *H04L 67/303* (2013.01); *H04L 63/1425* (2013.01); *H04L 63/1466* (2013.01); *H04L 67/22* (2013.01)

(58) Field of Classification Search
CPC ... H04L 67/303; H04L 63/1425; H04L 67/22; H04L 63/1466
See application file for complete search history.

(56) References Cited

U.S. PATENT DOCUMENTS

| | | | |
|---|---|---|---|
| 5,768,271 A | 6/1998 | Seid et al. | |
| 7,483,379 B2 | 1/2009 | Kan et al. | |
| 8,484,332 B2 * | 7/2013 | Bush | H04L 12/2807 709/223 |

(Continued)

OTHER PUBLICATIONS

Agarwal, Deb, et al.; "An Infrastructure for Passive Network Monitoring of Application Data Streams"; Proceedings of the 2003 Passive and Active Monitoring Workshop; p. 1-9; Mar. 1, 2003.

(Continued)

*Primary Examiner* — Kendall Dolly
(74) *Attorney, Agent, or Firm* — Cantor Colburn LLP; Jeffrey Labaw

(57) ABSTRACT

Embodiments include a network data collection and response system for enhancing security in an enterprise network providing a user-supplied computing device with access to the network. A network data collection and response system tracks network activity of the device and maintains a device inventory recording the device type and configuration information for the device along with a resource utilization profile for the device. The network data collection and response system detects high-risk or unauthorized network activity involving the device through passive monitoring without utilization of a data monitoring agent installed on the device and implements a response action to mitigate the high-risk or unauthorized network.

15 Claims, 3 Drawing Sheets

(56) References Cited

U.S. PATENT DOCUMENTS

| | | |
|---|---|---|
| 8,484,691 B2 | 7/2013 | Schmelzer |
| 2008/0109870 A1 | 5/2008 | Sherlock et al. |
| 2008/0120688 A1* | 5/2008 | Qiu .................... G06F 21/552 726/1 |
| 2014/0013434 A1* | 1/2014 | Ranum ................ H04L 63/145 726/24 |
| 2015/0007261 A1* | 1/2015 | Hecht .................. G06F 21/604 726/1 |
| 2015/0244645 A1* | 8/2015 | Lindo .................. H04L 47/823 709/224 |

OTHER PUBLICATIONS

Kim, Myung-Sup, et al.; "Application-Level Traffic Monitoring and an Analysis on IP Networks"; ETRI Journal; vol. 27; No. 1; p. 22-42; Feb. 2005.

Miller, Scott A.; "Specification of Network Access Policy and Verification of Compliance Through Passive Monitoring"; Master of Science Thesis in Computer Science, University of California Davis; p. 1-25; 1999.

Mousas, Aziz S., et al.; "Visualising Access Control: the PRISM Approach"; 2010 14th Panhellic Conference on Informatics; p. 107-111; 2010

Zangrilli, Marcia, et al.; "Using Passive Traces of Application Traffice in a Network Monitoring System"; IEEE; p. 77-86; 2004.

* cited by examiner

NETWORK DATA COLLECTION AND RESPONSE SYSTEM

BACKGROUND

The present invention relates generally to computer network security systems and, more specifically, to a passive network data monitoring and response system providing enhanced security for enterprise networks allowing user-supplied devices to connect to the networks.

Traditionally, companies have supplied and managed information technology (IT) equipment for their employees. As IT has become far less expensive, and with the extensive "consumerization" of IT through consumer electronics and cloud-based computing, many enterprises such as companies, universities and others are encouraging their users to purchase their own IT devices. Mobile devices, such as laptop computers, smartphones and tablets, have become so inexpensive and ubiquitous that many people are connecting their own user-supplied devices to the enterprise networks in a trend sometimes referred to as Bring Your Own Device (BYOD).

Enterprise supplied user devices, such as desktop computers, laptop computers, tablets and mobile smartphones, have traditionally been monitored by the enterprise itself by installing software-based asset management and security compliance tracking "agents" on devices supplied to authorized network users. This allows the enterprise operating the network to know where the devices are located, control the software installed, and manage the security posture of the devices, such as software security configurations, anti-virus, security patches, firewalls, etc. From an enterprise perspective, a challenge arises when allowing BYOD network access to user-supplied devices in that these personally owned mobile devices typically do not have enterprise managed security agent software installed on them. Configuring a large and constantly changing set of different types of mobile devices having different operating systems, capabilities and applications with enterprise managed agents as a condition of allowing network access can be expensive and cumbersome. The continued boom in consumerization of IT will render the traditional approaches increasingly impractical. In the absence of having an enterprise managed security agent installed on a user-supplied device, organizations lack insight into the devices that are active on the network and the associated security posture. The network administration may also be unable to track, limit or manage the network and external resources accesses by the BYOD devices.

SUMMARY

Embodiments include a method, system, or computer product for enhancing security in an enterprise network providing a user-supplied computing device with access to the network. The network includes local network resources accessible to the device via the enterprise network and a gateway for providing the device with access to external resources via the enterprise network. A connection protocol server assigns an address to the device for identifying the device on the enterprise network in response to a network access request received form the device. A network data collection and response system tracks network activity of the device passively without utilization of a data or security monitoring agent installed on the device. The system maintains a device inventory, recording the device type and configuration information inferred for each device along with a resource utilization profile for the device. The network data collection and response system detects high-risk or unauthorized network activity involving the device and initiate response actions to mitigate the high-risk or unauthorized network.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
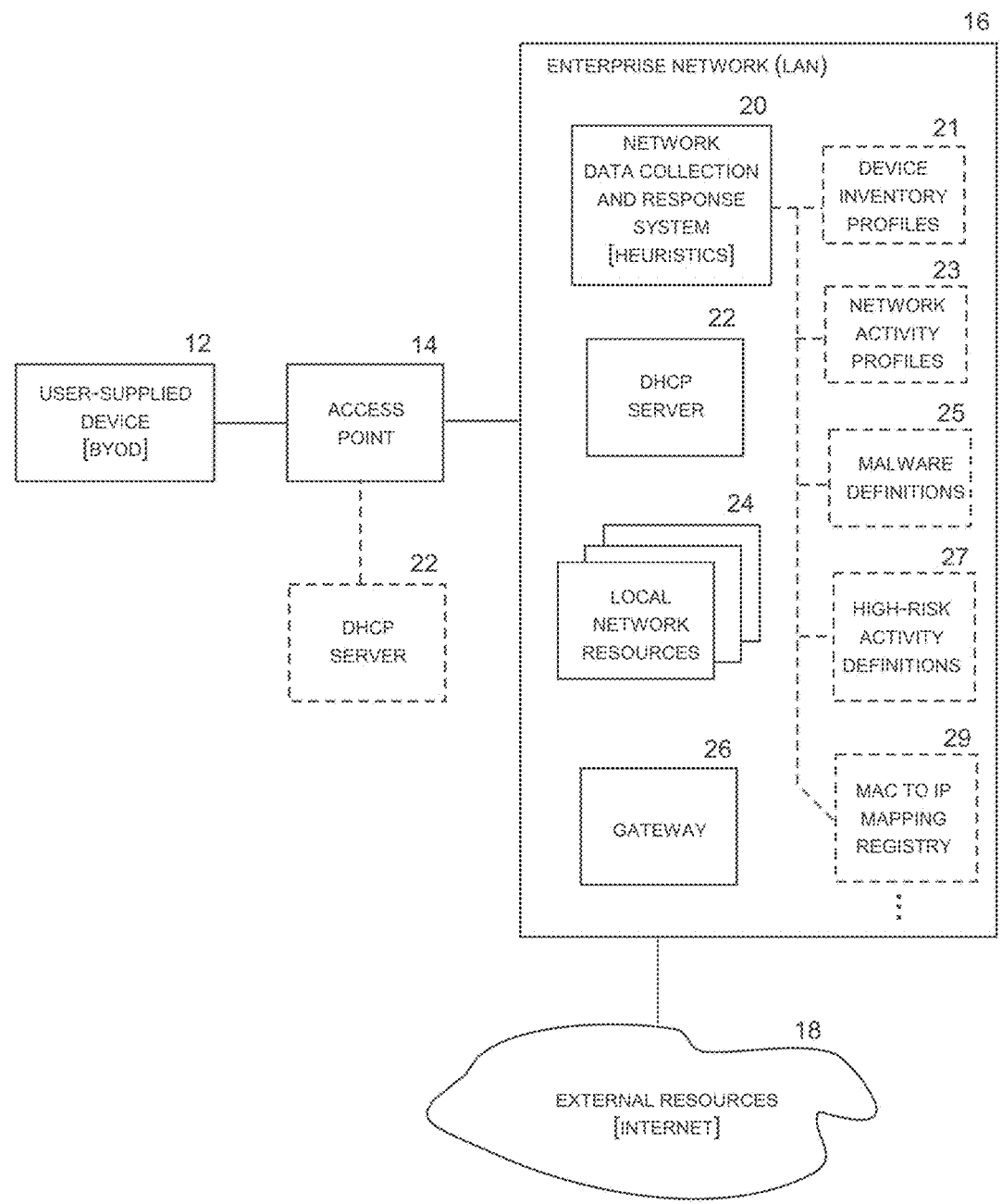
FIG. 1 depicts an enterprise network utilizing a network data collection and response system for managing and providing enhanced security for network access provided to a user-supplied device.

Embodiments of the invention may be realized in a network data collection and response system managing and providing enhanced security for network access provided to user-supplied desktop computers, laptop computers, tablets and smartphones accessing an enterprise network. FIG. 1 depicts an illustrative embodiment including an enterprise network 16 utilizing a network data collection and response system 20 to manage and enhance security for network access provided to a user-supplied device 12, which may be a mobile computing device such as laptop computer, tablet or smartphone. Although the system 20 is typically implemented as a server on the local network 16, it may be configured as part of another hardware component or distributed among a number of hardware components as a matter of design choice. The user-supplied device 12 registers with an access point 14, such as a Wi-Fi or other wireless access point, which provides the user-supplied device with access to the enterprise network 16 (also referred to as the local network or LAN), which further provides the device with access to local resources 24 on the LAN and external resources on the Internet 18 through a gateway 26. The data collection and response system 20 monitors, tracks, controls and limits the device's access to the network to identify and respond to unauthorized, inappropriate, and high-risk network activity.

In this particular embodiment, a dynamic host configuration protocol (DHCP) server 22 located on the access point 14 or on the network 16 provides the device 12 with a dynamically generated IP address. This provides the user-supplied device 12 with access to a range of local network resources 24 on the LAN 16, such as applications, databases, storage devices, servers, printers and so forth. The gateway 26 provides the device with access to external resources over the Internet 18 via the local network 16. The system 20 includes or interfaces with supporting data components, including a log of device inventory profiles 21, a log of inventory activity profiles 23, a log of malware definitions 25, a log of high-risk activity profiles 27, and other data repositories and heuristic data analysis tools.

Traditionally, enterprise entities, such as employers, universities and the like providing network access to a large number of users, supplied and managed the user devices that were authorized to access the network, which was restricted to the enterprise-supplied user devices. As computer technology has become far less expensive, and with wide ranging "consumerization" of network-capable devices through consumer electronics and cloud-based computing, enterprises are increasingly permitting, encouraging, and in some cases requiring their employees to purchase their own information technology. This BYOD trend allows user-supplied devices, such as laptop computers, tablets and smartphones, to access enterprise networks that often contain highly sensitive data and expensive infrastructure requiring protection from data leakage and other security risks.

The BYOD trend presents a challenge to enterprise network operators, which can no longer manage security risks by installing and maintaining software-based asset management and security compliance tracking "agents" on all devices authorized to access their networks. From an enterprise perspective, the problem with the BYOD trend is that these user-supplied and owned mobile devices accessing the enterprise network typically do not have agents installed on them. Without the ability to install and manage the agents installed on the BYOD devices, the enterprise network administrators lack insight into the devices active on the network including device configuration and the associated security posture. The enterprise network administrators may also lack the ability to effectively track and limit the resources accessed by the BYOD devices, which may include sensitive local network resources as well as external network access over the Internet. The result is that the organization cannot effectively assess, monitor, limit and respond to security risks posed by the user-supplied devices that are invited or even required to connect to the enterprise network.

The data collection and response system 20 provides a network-based solution that allows the enterprise to automatically detect and record (track) where the devices are located, determine the security posture of the devices (e.g., software security configurations, anti-virus protection, security patches, firewalls, and so forth), and manage the associated security risks. The system 20 passively tracks BYOD network activity, assesses security risks, and takes appropriate proactive responses without the need for specialized agents to be installed on the user-supplied device 12. These objectives are achieved for all types of mobile devices accessing the enterprise network through passive monitoring, analysis and response applied on the network side, without requiring advanced knowledge, registration, or installation of special agents on the user-supplied devices accessing the enterprise network.

By observing network activity, the network data collection and response system 20 infers which devices on the network are mobile devices and provides answers to critical security questions. As a result, the network data collection and response system provides a non-invasive solution applicable to any mobile device present on the network, including those devices that might manage to bypass existing mobile device and data management solutions. Monitoring on the network side, as opposed to monitoring on the mobile devices themselves, also renders this approach much more difficult for a malicious user or software to compromise, modify, or disable. In many cases, the network data collection and response system detects whether an application running on a mobile device has been modified or infected by malware. Moreover, unusual or suspicious network traffic and user behavior can be detected while it is happening, allowing effective response actions to mitigate high-risk or unauthorized activity network activity and prevent security breaches (e.g., malware, hacking) and undesired network activity (e.g., file sharing, entertainment streaming) from occurring in the first place. For example, one effective approach in many enterprise settings will be to block the unauthorized network activity and provide notice to a user of the device that the device has attempted to conduct unauthorized network activity. This will be sufficient in many cases to remind users of network utilization restrictions and obtain voluntary compliance with access rules that avoid known risks and enhance network security.

The system's passive monitoring capability typically includes determining user-supplied network access parameters, such as the number and configuration of mobile devices connected to the enterprise network, the frequency and temporal characteristics of network access, specific users purporting to be using the user-supplied devices on the network and the job functions or other roles of those users. The system logs device parameters and network traffic originating from the user-supplied devices to the local network resources as wells as traffic to external resources, including specific commands entered, services utilized, applications installed, data uploaded, and data downloaded by the mobile device. In the illustrative example shown in FIG. 1, the system 20 logs, analyzes and responds to network traffic from the user-supplied device 12 to local resources 24 as well as third-party resources accessed over the Internet 18 via the gateway 26. In particular, the system 20 detects and records a device inventory 21 including the device type and version(s) of the applications and operating systems utilized. The system 20 also detects and records a network activity profile 23 for the device including the timing and frequency of resources accessed, data uploaded and downloaded, specific data commands, the portion of network traffic directed towards local (corporate) resources 24 versus external (non-corporate) applications via the gateway 26, and so forth.

The network data collecting and response system 20 may also monitor, analyze, and respond to unauthorized network use and other security risks in real time. This typically includes monitoring which applications are used concurrently or in close temporal proximity and assessing the risks of data leakage, corruption and unauthorized use posed to the organization based on specific resources, combinations of resources, and data flows accessed by the device 12. For example, the system 20 may identify attempted access to applications that are known to pose vulnerabilities or offer services that the user is not authorized to access through the enterprise network, such as entertainment, banking, shopping and file sharing. The system 20 may also detect and block access to sites and downloads that have known malware or exhibit malicious behavior. The system 20 may also apply security clearance rules, block access to the organization's sensitive resources, and prevent the user-supplied device from accessing prohibited resources or engaging in other types of unauthorized, inappropriate, prohibited, high-risk or undesirable network activity.

The system 20 is configured to collect and record system security access data, such as the network resources that are most frequently used by mobile devices, whether the proper encryption has been applied to sensitive data such as passwords, whether non-encrypted data should have been encrypted, and whether mobile applications in use are properly licensed or from "unofficial" mobile markets. This information may be used to identify and respond to high-risk users, resources frequented by high-risk users, malicious external resources such as sites that distribute malware, and so forth.

The data monitoring and response system 20 builds and continually updates the dynamic device inventory 21 and the network activity profile 23 in real time for each mobile device that connects to the enterprise network. This provides an accurate, dynamically updated picture of each mobile device that connects to the network. Compared with conventional mobile device management techniques, the network data monitoring and response system provides improved insight into the network traffic of the mobile devices and is able to monitor, report and respond to current traffic patterns as well as internal and external services being utilized by user-supplied devices in real time. The network data collection and response system can also identify applications installed on the mobile devices without requiring an agent to be installed on the devices. This renders the system 20 independent of the user device platforms, non-invasive, and applicable to all mobile devices that connect to the enterprise network 16.

Figure 2:
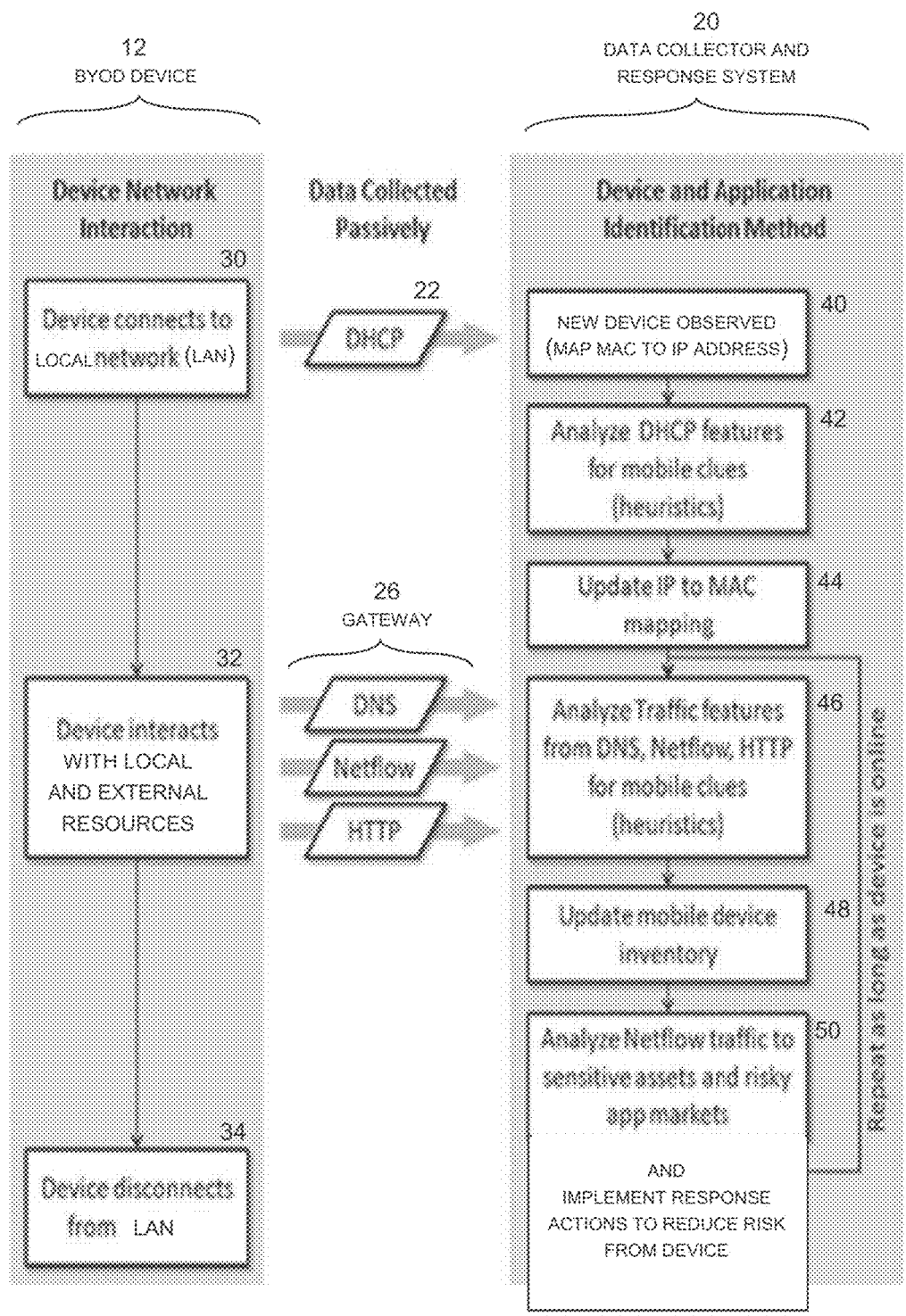
FIG. 2 depicts an operation of the network data collection and response system managing network access provided to a user-supplied device.

FIG. 2 depicts operation of the network data collection and response system 20 managing network access provided to a user-supplied device 12. The left column indicates the activity of the mobile device 12 with the network 16. The central column depicts network protocols that can be monitored by the DHCP 22 or other connection protocol server, the gateway 26, the data collection and response system 20, and any other cooperating resources to pick up the network activity of the mobile device. The right column depicts the operation of the network data collection and response system 20 to identify and record device inventory and network activity profiles allowing the system to perform identify user-supplied devices, track network activity, analyze the data, identify security and unauthorized use risks, and implement appropriate response actions.

More specifically, in the left column block 30 represents the user-supplied mobile device 12 connecting to the enterprise network 16 through the wireless access point 14. The DHCP server 22 located within the access point 14 or on the network 16 assigns a dynamically generated IP address to the user-supplied mobile device 12. When requesting the IP address, the device 12 supplies the access point 14 with a number of attributes in a network packet transmitted to the access point as part of the protocol for requesting the IP address. Although the specific attributes included in the network packet may vary from device to device and with certain settings, they generally include a media access control (MAC) address, device type, and default connection options such as protocol layer and application parameters and parameter request lists. The device operating system version can often be inferred from the contents of the network packet even when these attributes are not explicitly specified.

Block 32 represents network activity of the user-supplied mobile device 12, which may include access to local resources 24 on the enterprise network 16 as well as access to external resources typically via the Internet 18 using the gateway 26 provided on the network 16. The network activity includes DNS requests, network data (Netflow) packets, and hypertext transfer protocol (HTTP) requests that typically include headers and packet data from which device and access parameters are extracted or inferred. For example, heuristic search algorithms may be used to extract data from semi-structured header fields, resources accessed and data uploaded and downloaded may be tracked from Netflow packets and HTTP requests, and data streams may be scanned for keywords, such as device make, model, operating system version, patch level, known malware names and other content implying high-risk network activity. Relevant protocol-specific may be extracted from other monitored non-HTTP protocol traffic. Some of the activity analysis may be inferred from netflow data or other network traffic analysis. Block 34 represents disconnection of the device 12 from the network 16.

In the right column, in block 40 the network data collection and response system observes and tracks connection of the device 12 to the network 16. The system 20 creates a device inventory profile 21 and network activity profile 23 for each device that accesses the network. The system continually updates these profiles each time the device connects to the network. In block 42, the system 20 tracks and analyzes the DHCP attributes provided by the device 12 as well as the temporal parameters (e.g., time of day, day of week, length of connection) of the connection session. In block 44, the system 20 creates or updates an IP to MAC address mapping for the device. In block 46, the system 20 tracks and analyzes the network activity attributes including DNS requests, Netflow packets and HTTP requests for explicit information and other clues from which characteristic of the device 12 an the user operating the device may be inferred. In block 48, the system 20 creates or updates the mobile device inventory and network activity profiles for the device 12 to dynamically reflect the most current information that has been detected or inferred for the device. In block 50, the system 20 analyzes the network activity to identify high-risk activity and implement appropriate response actions. Block 50 is further expanded on FIG. 3.

Whenever the device 12 connects to the enterprise network 16 (where the network and environment may be limited through dynamically assigned IP addresses using the DHCP protocol), a set of DHCP messages are exchanged to request and assign an IP address to the device. The network data collection and response system 20 analyzes DHCP messages and identifies whenever a new device requests for an IP address. At this point, the system analyzes various properties of those messages (e.g., DHCP options) and applies heuristics to perform a first level of identification of the device's operating system. This allows the system to discern mobile from traditional desktop or server operating systems and, in some cases, is even able to identify the version of a mobile operating system.

The system 20 passively monitors network activity, including network protocols such as DHCP, HTTP, Netflow, and other observable network traffic information. The system 20 may utilize multiple approaches to collecting this kind of data, such as the use of a Security Event and Information Management (SIEM) system, wireless network monitoring, and traffic monitoring at network switches and routers. Once the traffic data has been collected, a set of analytical tools, such as the malware definitions 25 and high-risk activity definitions 27, are used to identify mobile devices and high-risk activity in real-time. These analytical tools may include heuristics that analyze DHCP requests, HTTP headers, network traffic protocols including DNS and Netflow data, resources accessed, and other factors based on known definitions, combinations of resources, and data provided by or to the mobile devices. Device identification heuristics can often discriminate the device type, operating system, applications, and their versions. Network activity heuristics and statistical analysis may identify known malware, file sharing sites, inappropriate response times indicating programmatic/robot (non-human) activity, hacking profiles, missing or inappropriate encryption, misuse of enterprise resources (e.g., entertainment streaming, online shopping, online banking), and suspicious activity patterns, such as accessing files for inappropriate operating systems, simultaneously or sequentially accessing sensitive enterprise and external resources indicating potential data leakage, and so forth.

By correlating device interface addresses (MAC addresses) to IP addresses (e.g., using DHCP or address resolution protocol (ARP) information), the network data collection and response system can monitor the Netflow, HTTP, DNS, and other network traffic to determine a wide range of parameters having potential security utility, such as the specific mobile devices that are connected to the organization's network, how often, when, which operating system version, application versions, which services are being visited via the organization's network, how often these applications are being used, which proportion of the network traffic is for accessing organization resources versus third-party services, which devices are accessing sensitive organization resources, which applications are being used concurrently to access networked resources, and which devices are connecting to "unofficial" or risky app markets.

From the DHCP messages, the (hardware) MAC address of the devices is extracted and entered or added to the mobile device inventory 21. This mobile device inventory contains a range of data including mappings between MAC addresses and device properties such as (and not limited to) the current IP address, inferred device type, device operating system, applications utilizing the network, and version. The mapping between the MAC address of a device and the DHCP assigned IP address is extracted and kept in a registry. Whenever modifications of this mapping (e.g., new IP address for a given MAC address or vice versa, IP address lease expires) are observed, the registry is updated. This registry is used to uniquely identify the device in all observations from network protocols that are using IP address identifiers only (and do not report the MAC address).

Whenever the device is active on the network, for example creating a new network connection, the system 20 observes and logs these activities (or selected attributes of the activities) in the network activity profile 23 for the device. The contents of data streams are analyzed and a set of heuristics are applied to extract information indicating the presence, identity, configuration and activity of the mobile device 12. For example, the HTTP protocol provides header and content information of all web traffic. The system 20 analyzes the HTTP headers, or more specifically, the user-agent string reported by the HTTP client application. Dynamically updated heuristics mine the string for indications of mobile identifiers such as (but not limited to) operating system names and versions, mobile application names and versions, device name and model, server application names and version, vendor or cellular carrier information. This may include fixed encodings used in user-agent strings of many application clients to extract this information. Using the IP/MAC address registry 21, the MAC address is resolved from the IP address supplied from the HTTP protocol monitoring and updates/extends the properties in mobile device inventory. Moreover, the system typically registers usage of the mobile application (e.g., web browser, social network application, weather application, etc.) and its version in the mobile device inventory 21 together with the device identifier. Those skilled in the art will recognize that application protocols other than HTTP can be analyzed in a similar fashion.

The Netflow protocol provides connection-level information of all network traffic allowing the system 20 to track access to both internal and external resources from devices in the mobile device inventory. The Netflow protocol can be furthermore correlated with DNS lookup data (providing the domain names looked up by the devices) to further discriminate the services being used, especially for larger services that load balance by having multiple IP addresses to the same service (e.g., Akamai, cloud services). Moreover, the Netflow protocol (possibly in combination with DNS) is used to identify applications installed on the mobile devices that connect to the same external server/service or use specific network ports. Finally, the volume of data can be measured between the mobile device and the networked service.

The network data collection and response system 20 may also correlate destination information with lists of known high-value assets within the corporate environment, and unofficial application stores (some of which are known to offer malicious applications). The system may also determine how many mobile devices are connected to the organization's network, how often specific devices connect, when, and the duration of the connection. The mobile device inventory list provides information about the mobile devices connected the network. By maintaining a history of all registration event and connections, the present method embodiments can indicate frequency and temporal properties.

The system 20 may, for example, track the actual users operating the mobile devices on the network including their job functions and titles. When wireless (e.g., Wi-Fi) authentication logs are available, the system associates the specific devices with the actual users. Similarly, if the organization registers the MAC address, then there can be an association with the user. The HTTP headers may include user identifier information that can associate the device with the user. Moreover, the device name reported in DHCP requests can be used to infer the owners' names. The organization directory (LDAP, MS AD) can be used to identify job functions and titles. The internal and/or external resources accessed can also be used to infer job functions and titles.

The system 20 also tracks specific types of network traffic originating from each device including, for example, access gained to internal enterprise resources (e.g., LAN devices) as well as external resources (e.g., Internet, private network resources, connected devices such as flash drives, etc.). The system may also be able to track specific services used. HTTP and Netflow data or (more generally) full traffic captures can reveal which resources the devices are accessing, whether they are internal or external, the volume of data going over the network, and other activity parameters. In the context of Netflow, DNS data can further discriminate the services being used, especially for larger services that load balance by having multiple IP addresses to the same service (e.g., Akamai).

The system 20 may also be able to track specific types of applications installed and used by the mobile device, which may include both corporate and third-party apps and services. When detected, the system tracks the specific version(s) of the applications utilized, which applications are most frequently used, and the temporal characteristics of the access (e.g., weekdays during business hours, nights, weekends, etc.). Similarly, the system 20 may determine the proportion of network traffic directed towards corporate applications. As noted above, netflow and DNS data can be used to identify which applications are being used; HTTP header and Netflow data can be used to identify app names and versions; and Netflow data can be used to infer the network traffic volume for specific mobile apps and other applications provided on enterprise network and externally by third parties. Those skilled in the art will recognize that application protocols other than HTTP can be analyzed in a similar fashion.

The HTTP header and/or Netflow data can also be used to identify the most frequently used applications. The timestamps on the Netflow and/or HTTP header data can be used to infer the usage frequency and time distributions. The system also tracks applications used concurrently or sequentially, which may indicate a risk of data leakage, malware corruption, or other security breach. High-risk activity may be detected by comparing network activity with known risk factors, such as the malware definitions 25 and the high-risk activity definitions 27. By analyzing HTTP headers, Netflow and/or DNS data and the associated timestamps, the system 30 can determine that two or more mobile apps are operating concurrently. Heuristics identifying known risk factors, such as sensitive resources, high-risk resources, suspicious activity patterns, suspicious combinations of active resources may be used individually, in combination, and with statistical analysis to determine an increased probability of data leakage, corruption or other security risk. For example, dynamically updated heuristics may be used to identify sensitive resources with known vulnerabilities, external resources and file types known exhibit malicious behavior. Third-party security intelligence, such as malware lists and security risk activity profiles, may be used to augment and update the malware definitions 25 and the high-risk activity definitions 27 and the dynamic heuristic algorithms maintained as part of the system 20 to help to identify and respond to constantly changing security threats.

Enterprise integration and system management (EISM) and similar techniques may also be used to track which corporate services are most frequently used by the mobile device 12, identify whether and when the devices accesses sensitive organization data, and so forth. The system 20 may track access patterns, keystrokes and other inputs to identify anomalous and inappropriate network traffic that does not match known or authorized application access patterns as an indication of an increased security risk. For example, the device 12 making application requests and passing anomalous header data may be an indication of a malicious app. This may be indicated, for example, by apps trying to mimic apps designed for platforms and operating systems other than those installed on the accessing device 12. The system 20 may also track whether the device 12 uses the enterprise network 16 to accesses the enterprise's own web sites, whether other sensitive data or services are accessed over the LAN 16 or the gateway 26 at the same time or sequentially, and the other applications that are active on the device (or on the network 16 under control of the device) when the website is accessed. Similar tracking can be applied to any of the network resources 24, the gateway 26 generally, or specific external resources known to pose a security risk.

The system 20 may also determine whether sensitive data provided by the device 12 is properly encrypted, for example whether data that should be encrypted such as passwords are not encrypted. The system may also track which mobile devices access applications on "unofficial" mobile markets known to present malware and other types of security risks. Third-party security intelligence may be leveraged to provide malware distribution statistics for unofficial markets to help identify users, sites, markets, devices and other resources with higher distribution of malware or otherwise representing an elevated risk of attack. These third-party security resources may be consulted periodically to identify malware, hacking profiles, markets that have higher incidents of malware distribution, and so forth. Once a high-risk application has been identified, the system 20 may search the official and unofficial markets to identify where high-risk unofficial versions of software application are hosted and update the heuristics accordingly. Sites distributing malware can be further correlated with application-to-device mapping to identify devices that use these applications. The traffic originating from a particular device and accessing the unofficial markets can further identify devices downloading applications from these markets.

Figure 3:
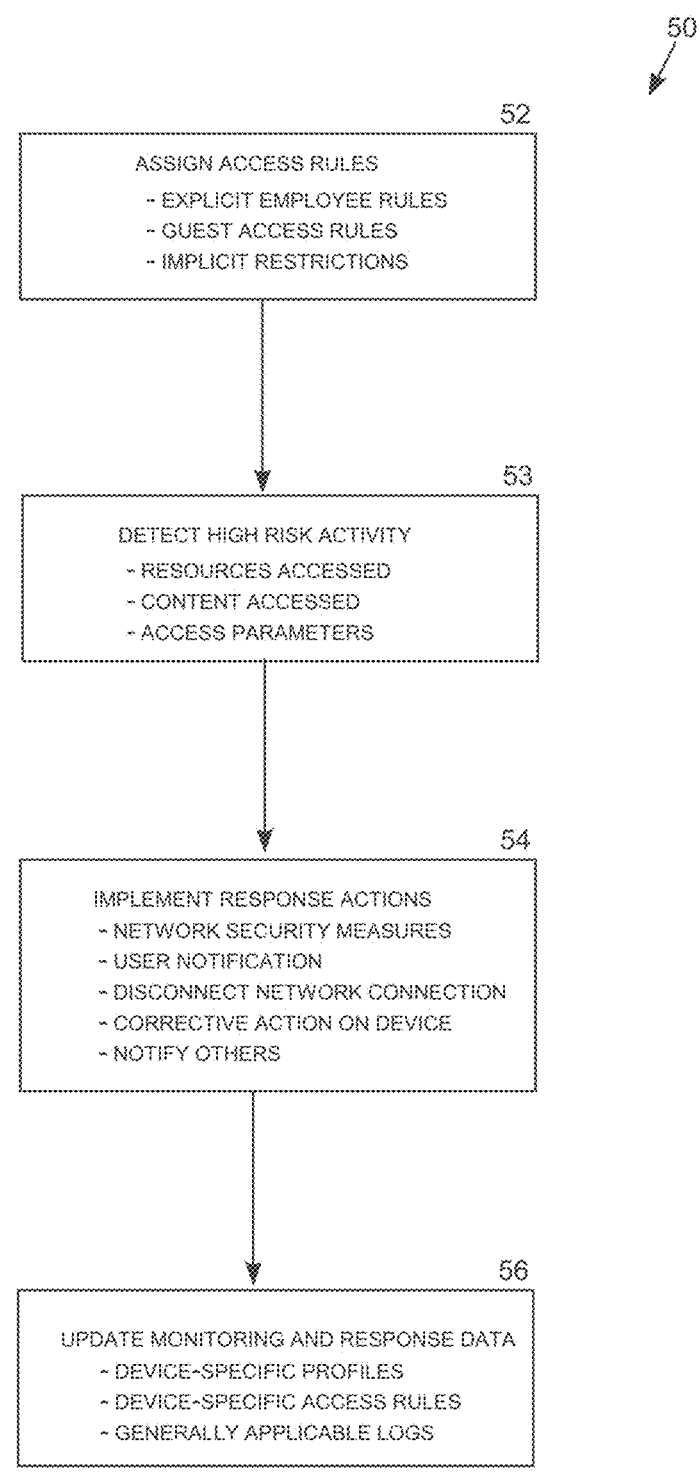
FIG. 3 depicts security response actions implemented by the network data collection and response system.

FIG. 3 depicts security response actions 50 implemented by the network data collection and response system 20. In block 52, the system 20 assigns access rules defining permissions that may limit local and external network access provided to the device 12. For example, each employee may have a specific permission profile defined by the network administrations appropriate for their job description and security clearance. For example, employees may have security defined permission limits to local resources and be restricted from engaging in entertainment streaming, banking and shopping through the enterprise network. Guest access may also have assigned access limiting access to certain public resources and Internet sites. The system may block unauthorized network activity and provide notice to a user of the device that the device has attempted to conduct unauthorized network activity to advise the user that unauthorized activity and been detected and dissuade the user from attempting to engage in further unauthorized activity. Protective restrictions may also be imposed on an as-needed basis based on the device profile and network activity. For example, browsing restrictions may be applied to a device that has presented malware in the past, and heightened security protocols may be applied to any device that has demonstrated high-risk, hacking, unauthorized, or inappropriate activity.

In block 53, the system 20 detects high-risk network activity by tracking and analyzing resources accessed, content accessed or provided, and other access parameters. Suitable examples in this regard may include detecting malware, browsing file sharing, streaming data, banking and shopping sites. The system 20 may also detect credit card data profiles, hacking profiles, unauthorized file sharing profiles, and other types of data indicating unauthorized or inappropriate network usage. As additional examples, the system 20 may detect very fast or unusual response times indicating programmatic or robot activity, incorrect or missing encryption, network activity that is inappropriate for the time of day or day of week, questionable services called such as those inappropriate for the user's job function, and applications or files accessed that are incompatible with the configuration or type of user-supplied device utilized. The system 20 may also detect suspicious patterns and combinations, such as those typically associated with data leakage, hacking, infiltration and corruption.

To provide a few illustrative examples, suspicious activity patterns might be a (fake) banking app that calls a server in South America; accessing a banking site and a file sharing site at the same time; accessing an external site and repetitive transmission of data entries consistent with password hacking; accessing an enterprise website page containing public information pertaining to an employee at the same time attempts are made to access that employee's local resources; attempts to download data when a file sharing site is open; sensitive data downloads occurring late at night or on weekends; attempts to access data inconsistent with an employee's job description; entertainment, data streaming, shopping or banking access during work hours; and so forth.

In block 54, the system 20 implements appropriate response actions that may involve one or more of network security measures including, but not limited to, user notification, disconnection of the device from the network, implementing corrective action on the network and/or device, and notification of others. Illustrative examples include blocking the device from accessing certain internal or external resources, restricting the device within the LAN, disabling or limiting gateway access, malware removal, notification of the user of unauthorized activity, logging network data for further investigation, reporting suspicious or malicious activity to DNS servers and other authorities.

In block 56, the system 20 updates monitoring and response data based on monitored network activity of the device 12, which may include device-specific profiles and access rules, as well as generally applicable risk definitions. Illustrative examples of device-specific logs include the device inventory 21 (e.g., device type, operating system, types and versions of applications and extension running on the device), the network activity log 23 for the device, and network access rules for the device. Examples of generally applicable logs include the malware definitions 25 and the high-risk activity profiles 27, such as hacking profile definitions, high-risk resource definitions, combinations of active resources indicative of data leakage, and so forth.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device (s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An enterprise network that is accessible to a computing device, the enterprise network comprising:
    local network resources accessible to the device via the enterprise network;
    a connection protocol server comprising a memory storing instructions and a processor executing the instructions, the processor of the connection protocol server executing instructions to assign a network address to the device to identify the device on the enterprise network in response to a network access request received from the device;
    a network data collection and response system of the enterprise network that is operative to track network activity of the device including a device inventory comprising device type and configuration information for the device and a resource utilization profile for the device without utilization of a data monitoring agent installed on the device;
    the network data collection and response system of the enterprise network is further operative to detect high-risk or unauthorized network activity involving the device through passive monitoring without utilization of a monitoring agent installed on the device, wherein to detect high-risk or unauthorized network activity comprises identifying attempted access to applications that offer services that are not authorized by the enterprise;
    the network data collection and response system further operative to implement a response action to mitigate the high-risk or unauthorized network activity, wherein the response action comprises one or more of:
        blocking the unauthorized network activity and providing notice to a user of the device that the device has attempted to conduct unauthorized network activity;
        notifying a user or monitoring system of the device of malware present on the device and removal of the malware from the device;
        detecting malware transmitted from the device; and
        removal of the malware from the enterprise network.

2. The enterprise network of claim 1, further comprising a gateway configured in a local network to provide the device with access to external resources via the local network.

3. The enterprise network of claim 1, wherein the passively monitored network activity includes one or more of a dynamic host configuration protocol (DHCP) request received from the device and a domain name server (DNS) request received from the device.

4. The enterprise network of claim 1, wherein the passively monitored network activity includes one or more of a network flow information derived from network packets sent and received by the device and a hypertext transfer protocol (HTTP) request sent and response received by the device.

5. The enterprise network of claim 1, wherein the high-risk or unauthorized network activity comprises one or more of:
    a combination of resources accessed by the device consistent of a high-risk activity profile maintained by the system; and
    short response times and periodic response patterns indicative of programmatic or robot activity.

6. The enterprise network of claim 1, wherein the network data collection and response system tracks and profiles the resource utilization of a device.

7. The enterprise network of claim 1, wherein the network data collection infers one or more of the type and configuration information of the device.

8. A computer program product for providing a user-supplied computing device with access to an enterprise network comprising local network resources accessible to the device via the enterprise network, the computer program product comprising:
    a non-transitory computer readable storage medium readable by a processing circuit and storing instructions that, when executed by the processing circuit, perform a method comprising:
    tracking, by the enterprise network, network activity of the device through passive monitoring without utilization of a data monitoring agent installed on the device;
    inferring type and configuration information of the device;
    creating a device inventory comprising device type and one or more of configuration information for the device and a resource utilization profile for the device;
    detecting, by the enterprise network, one or more of high-risk or unauthorized network activity involving the device, wherein the detecting high-risk or unauthorized network activity comprises identifying attempted access to applications that offer services that are not authorized by the enterprise; and
    implementing a response action to mitigate the high-risk or unauthorized network activity, wherein the response action comprises one or more of:
        blocking the unauthorized network activity and providing notice to a user of the device that the device has attempted to conduct unauthorized network activity;
        notifying a user or monitoring system of the device of malware present on the device and removal of the malware from the device;
        detecting malware transmitted from the device; and
        removal of the malware from the enterprise network.

9. The computer program product of claim 8, wherein tracking network activity includes one or more of detecting and recording a dynamic host configuration protocol (DHCP) request received from the device, a domain name server (DNS) request received from the device, a network flow information derived from network packets sent and received by the device, and a hypertext transfer protocol (HTTP) request sent and response received by the device.

10. The computer program product of claim 8, wherein the high-risk or unauthorized network activity comprises a combination of resources accessed by the device consistent of a high-risk activity profile maintained by the system.

11. The computer program product of claim 8, wherein the high-risk or unauthorized network activity comprises a short response times indicative of robot activity.

12. The computer program product of claim 8, wherein the network data collection and response system tracks and profiles the resource utilization of a device.

13. The computer program product of claim 8, wherein the network data collection infers one or more of the type and configuration information of the device.

14. A network data recording and response system for enhancing security in a computer enterprise network providing a computing device with access to the enterprise network, the system operable for:
   assigning, by a processor executing instructions stored on a memory of a connection protocol server, a network address to the device to identify the device on the enterprise network in response to a network access request received from the device;
   tracking, by the enterprise network, network activity of the device through passive monitoring without utilization of a data monitoring agent installed on the device;
   inferring one or more of type and configuration information of the device;
   creating a device inventory comprising one or more of device type and configuration information for the device and a resource utilization profile for the device;
   detecting, by the enterprise network, high-risk or unauthorized network activity involving the device, wherein the detecting high-risk or unauthorized network activity comprises identifying attempted access to applications that offer services that are not authorized by the enterprise; and
   implementing a response action to mitigate the high-risk or unauthorized network activity, wherein the response action comprises one or more of:
      blocking the unauthorized network activity and providing notice to a user of the device that the device has attempted to conduct unauthorized network activity;
      notifying a user or monitoring system of the device of malware present on the device and removal of the malware from the device;
      detecting malware transmitted from the device; and
      removal of the malware from the enterprise network.

15. The network data recording and response system of claim 14, wherein tracking network activity includes one or more of detecting and recording a dynamic host configuration protocol (DHCP) request received from the device, a domain name server (DNS) request received from the device, a network flow information packet received form the device, and a hypertext transfer protocol (HTTP) request received from the device.

* * * * *